3,201,408
HETEROCYCLIC ORGANOTIN COMPOUNDS
Carl C. Greco, Bronx, N.Y., assignor to Stauffer Chemical Company, New York, N.Y., a corporation of Delaware
No Drawing. Filed June 5, 1963, Ser. No. 285,584
6 Claims. (Cl. 260—299)

This invention relates to organic tin derivatives of heterocyclic ring systems. More particularly, the invention pertains to organotin derivatives in which the tin is bonded to a 1,3,4-thiadiazole ring. The invention likewise includes the methods of preparing the aforesaid compounds.

The novel organotin heterocyclic derivatives as contemplated herein can be represented by the following formulae:

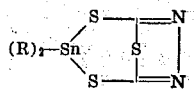

and

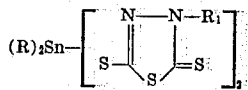

wherein R signifies an alkyl radical of from 1 to 10 carbon atoms, e.g. methyl, ethyl, n-propyl, sec.-butyl, isobutyl, n-pentyl, isohexyl, n-heptyl, n-octyl, isooctyl, n-nonyl, n-decyl and the like, and a phenyl radical which can have attached thereto a relatively inert substituent such as lower alkyl, lower alkoxyl, chlorine or the like and $R_1$ represents lower alkyl or phenyl.

Compounds which typify the above described configuration are included in the appended examples and in the following list of specific formulae:

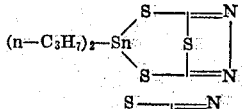

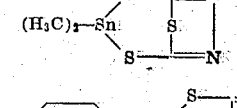

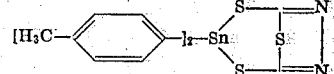

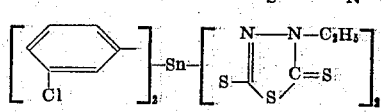

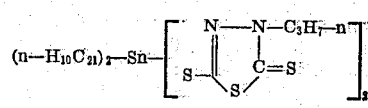

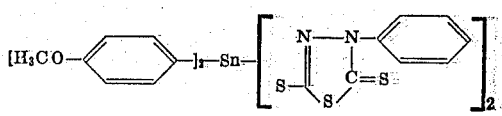

In preparing the organtin thiadiazoles of the invention, an oragnotin intermediate such as a dialkyltin oxide or dialkyltin chloride is reacted with a thiadiazole reactant having attached to the ring thereof a free mercapto group or its alkali metal salt. The reaction can be schematically depicted by the following chemical equations:

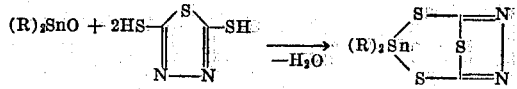

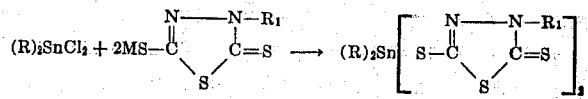

wherein R and $R_1$ have the significance as previously defined and M represents an alkali metal or ammonium radical.

Generally speaking, excellent yields are realized by refluxing equivalent amounts of the reactants in the presence of a normally liquid organic solvent and for this purpose the lower saturated alcohols, including their ether derivatives, and liquid hydrocarbons of the saturated aliphatic and aromatic series have proved to be satisfactory. As examples of specific solvents, mention is made of methanol, n-propanol, ethanol, benzene, toluene, xylene, Cellosolve and the like. It is to be pointed out that wherever the organotin intermediate is the oxide, then the thiadiazole is preferably used having a free mercapto function. On the other hand, when employing a dialkyltin chloride, it is recommended that the thiadiazole have the mercapto substituent in the form of its alkali metal salt. By the term alkali metal salt is also included the ammonium and substituted ammonium salts, e.g. ammonium, lower alkylated ammonium, e.g. tetramethylammonium, tribenzylmethylammonium, pyridinium and the like.

Reference is now made to the following examples which are inserted for purposes of illustration only and those skilled in the art will appreciate that various modifications of the invention can be practiced without departing from the spirit and scope thereof.

EXAMPLE 1

*Dibutyltin(1,3,4-thiadiazole-2,5-dimercaptide)*

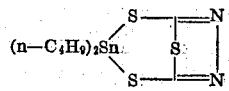

In a 500 cc. flask, equipped with stirrer, thermometer and a Dean-Stark apparatus was suspended 17.4 g. (0.07 m.) of dibutyltin oxide and 10 g. (0.07 m.) of 2,5-dimercapto-1,3,4-thiadiazole in 150 cc. of toluene. The reaction mixture was slowly heated to reflux. After 3 hours of refluxing the theoretical amount of water was azeotroped off. The reaction mixture was filtered hot, and the solvent was removed by vacuum distillation. The remaining colorless, crystalline solid was collected as the product; M.P. 120° C. Elemental analyses and spectra confirmed the proposed structure. Yield 24 g. (95%). Analysis of tin: calc.—31.4%; found—30.6%.

EXAMPLE 2

*Dioctyltin(1,3,4-thiadiazole-2,5-dimercaptide)*

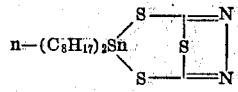

This product was prepared analogous to Example 1 from 17 g. (0.042 m.) of dioctyltin oxide and 6.2 g. (0.042 m.) of 2,5-dimercapto-1,3,4-thiadiazole. Product, 18 g. (80% yield), was a colorless, crystalline solid, M.P. 52° C. The structure was confirmed by elemental and I.R. analyses.

EXAMPLE 3

*Dibutyltin(1,3,4-thiadiazole-2,5-dimercaptide)*

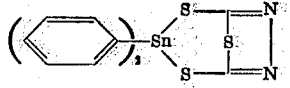

This product was prepared analogous to Example 1 from 7.5 g. (0.05 m.) of 2,5-dimercapto-1,3,4-thiadiazole and 14.5 g. (0.05 m.) of diphenyltin oxide. The product, 19 g. (90% yield) was a viscous, yellow oil.

EXAMPLE 4

*Dioctyltin bis(3-phenyl-1,3,4-thiadiazole-2-thione 5-mercaptide)*

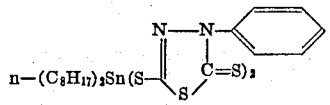

In a 250 cc. flask, equipped with stirrer, thermometer and reflux condenser was dissolved the potassium salt of 5-mercapto-3-phenyl-1,3,4-thiadiazole-2-thione, 9 g. (0.034 m.), in 100 cc. of ethanol. Then 7 g. (0.017 m.) of dioctyltin dichloride, dissolved in 25 cc. of ethanol, was added dropwise at 40° C. After the addition was complete the reaction mixture was refluxed for 3 hours. The reaction mixture was then poured into water, extracted with benzene, dried over $Na_2SO_4$ and solvent stripped. The remaining crude solid was crystallized from 50 cc. of ethanol. The yield of colorless crystals, melting at 95° C., amounted to 12 g. (90%). Elemental analyses and spectra confirmed the proposed structure.

EXAMPLE 5

*Dibutyltin bis (3-methyl-1,3,4-thiadiazole-2-thione 5-mercaptide)*

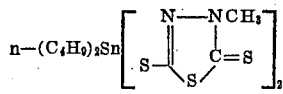

This product was prepared analogous to Example 4 from 20.2 g. (0.1 m.) of the potassium salt of 5-mercapto-3-methyl-1,3,4-thiadiazole-2-thione and 15.2 g. (0.05 m.) of dibutyltin dichloride. Product, 19.4 g. (85% yield), was a colorless, crystalline solid, M.P. 120° C. Elemental analyses and spectra confirmed the proposed structure.

In addition to constituting a new and novel class of organotin derivatives, the compounds of the invention are useful in various applied arts and fields. I have, for instance, ascertained that the compounds are useful as stabilizers for plastics such as polyolefins. In this connection, reference is called to the compound of Example 1 which, when incorporated into isotactic polypropylene, increased the resistance of the polymer to degradation and embrittlement at moderately elevated temperatures, i.e. in the vicinity of 150° C.

I claim:

1. A heterocyclic organotin compound selected from the group consisting of:

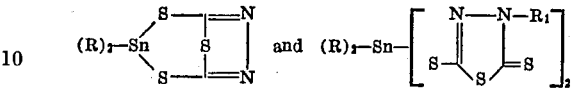

wherein R is selected from the class consisting of alkyl having from 1 to 10 carbon atoms and phenyl and $R_1$ is selected from the class consisting of lower alkyl and phenyl.

2. A heterocyclic organotin compound of the formula:

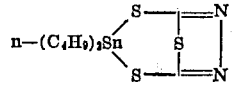

3. A heterocyclic organotin compound of the formula:

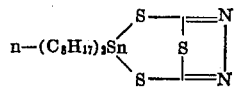

4. A heterocyclic organotin compound of the formula:

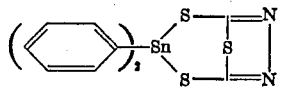

5. A heterocyclic organotin compound of the formula:

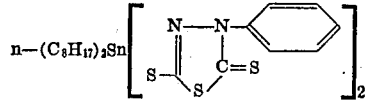

6. A heterocyclic organotin compound of the formula:

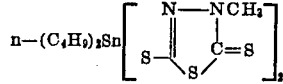

References Cited by the Examiner
UNITED STATES PATENTS
2,713,580   7/55   Stefl et al. _____ 260—299

NICHOLAS S. RIZZO, *Primary Examiner.*

UNITED STATES PATENT OFFICE
CERTIFICATE OF CORRECTION

Patent No. 3,201,408　　　　　　　　　　　　　　　　　August 17, 1965

Carl C. Greco

It is hereby certified that error appears in the above numbered patent requiring correction and that the said Letters Patent should read as corrected below.

Column 2, EXAMPLE 1, for that portion of the formula reading $(n-C_4H_9)_2Sn$ read $n-(C_4H_9)_2Sn$ same column 2, EXAMPLE 3, for "Dibutyltin(1,3,4-thiadiazole-2,5-dimercaptide), in italics, read -- Diphenyltin(1,3,4-thiadiazole-2,5-dimercaptide), in italics.

Signed and sealed this 22nd day of February 1966.

(SEAL)
Attest:

ERNEST W. SWIDER　　　　　　　　　　　　　　　　　EDWARD J. BRENNER
Attesting Officer　　　　　　　　　　　　　　　　　Commissioner of Patents